(12) United States Patent
Yoshida et al.

(10) Patent No.: US 10,519,791 B2
(45) Date of Patent: Dec. 31, 2019

(54) SHAFT SEALING DEVICE, ROTATING MACHINE, AND METHOD FOR MANUFACTURING SHAFT SEALING DEVICE

(71) Applicant: MITSUBISHI HEAVY INDUSTRIES, LTD., Tokyo (JP)

(72) Inventors: Azumi Yoshida, Tokyo (JP); Hidekazu Uehara, Tokyo (JP); Kohei Ozaki, Tokyo (JP); Shin Nishimoto, Tokyo (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 268 days.

(21) Appl. No.: 15/034,319

(22) PCT Filed: Nov. 10, 2014

(86) PCT No.: PCT/JP2014/079690
§ 371 (c)(1),
(2) Date: May 4, 2016

(87) PCT Pub. No.: WO2015/076132
PCT Pub. Date: May 28, 2015

(65) Prior Publication Data
US 2016/0281520 A1    Sep. 29, 2016

(30) Foreign Application Priority Data
Nov. 22, 2013 (JP) .................................. 2013-241956

(51) Int. Cl.
*F01D 11/00* (2006.01)
*F16J 15/3292* (2016.01)

(52) U.S. Cl.
CPC ............ *F01D 11/00* (2013.01); *F16J 15/3292* (2013.01); *F05D 2220/32* (2013.01); *F05D 2240/57* (2013.01); *F05D 2240/60* (2013.01)

(58) Field of Classification Search
CPC .......... F05B 2240/572; F05B 2240/571; F01D 11/001; F16J 15/3292; F05D 2240/57; F05D 2240/59
(Continued)

(56) References Cited

U.S. PATENT DOCUMENTS

| 6,267,381 B1 | 7/2001 | Wright |
| 6,590,267 B1 | 7/2003 | Goodwin-Johansson et al. |

(Continued)

FOREIGN PATENT DOCUMENTS

| CN | 101573206 | 11/2009 |
| CN | 102667067 | 9/2012 |

(Continued)

OTHER PUBLICATIONS

Extended European Search Report dated Dec. 6, 2016 in corresponding European Application No. 14863444.7.
(Continued)

*Primary Examiner* — Eugene G Byrd
(74) *Attorney, Agent, or Firm* — Wenderoth, Lind & Ponack, L.L.P.

(57) ABSTRACT

A shaft sealing device includes a plurality of leaves that is arranged in a periphery of a rotating shaft and divides a space around the rotating shaft into two spaces in an axial direction of the rotating shaft, and a side seal plate that is arranged on one side of the plurality of leaves in the axial direction of the rotating shaft and has an opposite surface facing a side end on one side of the plurality of leaves. The side seal plate has a friction reducing portion for reducing a friction force between the opposite surface of the side seal
(Continued)

plate and a surface of the side end on the one side of the plurality of leaves.

5 Claims, 11 Drawing Sheets

(58) Field of Classification Search
USPC ............ 277/411, 412, 347, 355, 421, 402; 415/174.2, 173.4
See application file for complete search history.

(56) References Cited

U.S. PATENT DOCUMENTS

| | | | | |
|---|---|---|---|---|
| 6,874,788 | B2* | 4/2005 | Kono | F16J 15/3292 277/355 |
| 7,226,053 | B2* | 6/2007 | Nakano | F16J 15/4472 277/355 |
| 7,261,515 | B2* | 8/2007 | Nishimoto | F16J 15/3292 277/355 |
| 7,828,297 | B2* | 11/2010 | Hoebel | F16J 15/3292 277/355 |
| 8,025,296 | B2* | 9/2011 | Uehara | F01D 11/00 277/355 |
| 8,220,802 | B2* | 7/2012 | Rhodes | F16J 15/3292 277/412 |
| 8,250,756 | B2* | 8/2012 | Adis | F16J 15/3292 277/355 |
| 8,262,349 | B2* | 9/2012 | Turnquist | F01D 11/025 277/412 |
| 8,382,120 | B2* | 2/2013 | Deo | F01D 11/02 277/355 |
| 8,474,827 | B2* | 7/2013 | Grondahl | F01D 11/02 277/411 |
| 8,859,078 | B2 | 10/2014 | Maurin-Perrier et al. | |
| 9,404,375 | B2 | 8/2016 | Uehara et al. | |
| 2003/0068224 | A1* | 4/2003 | Uehara | F16J 15/3292 415/170.1 |
| 2004/0256810 | A1* | 12/2004 | Nakano | F16J 15/3292 277/402 |
| 2008/0042366 | A1* | 2/2008 | Awtar | F01D 11/003 277/411 |
| 2008/0265514 | A1* | 10/2008 | Mortzheim | F01D 11/00 277/303 |
| 2009/0309311 | A1* | 12/2009 | Verma | F01D 11/00 277/411 |
| 2010/0024592 | A1* | 2/2010 | Maurin-Perrier | B23K 26/0084 74/640 |
| 2010/0247309 | A1* | 9/2010 | Ambrosy | F01D 11/001 415/230 |
| 2011/0148046 | A1* | 6/2011 | Jahn | F16J 15/3292 277/412 |
| 2011/0316237 | A1* | 12/2011 | Uehara | F01D 11/001 277/413 |
| 2012/0261884 | A1* | 10/2012 | Uehara | F01D 11/001 277/411 |
| 2013/0042456 | A1 | 2/2013 | Anand et al. | |
| 2013/0181412 | A1* | 7/2013 | Shinohara | F16J 15/16 277/500 |

FOREIGN PATENT DOCUMENTS

| | | |
|---|---|---|
| EP | 1 070 887 | 1/2001 |
| JP | 2003-343730 | 12/2003 |
| JP | 2005-69404 | 3/2005 |
| JP | 2007-321986 | 12/2007 |
| JP | 2010-507056 | 3/2010 |
| JP | 2011-185219 | 9/2011 |
| JP | 2013-40682 | 2/2013 |
| JP | 2013-145007 | 7/2013 |
| WO | 2006/016098 | 2/2006 |

OTHER PUBLICATIONS

International Search Report dated Feb. 17, 2015 in corresponding International Application No. PCT/JP2014/079690.
Hideyuki Inoue et al., "The Effects of Dimple Diameter for Sliding Properties of Mechanical Seal", Proceedings of JAST Tribology Conference (CD-ROM), D1, Japanese Society of Tribologists, Oct. 23, 2013.
Written Opinion of the International Searching Authority dated Feb. 17, 2015 in corresponding International Application No. PCT/JP2014/079690.
Office Action dated Sep. 2, 2016 in corresponding Chinese Application No. 201480059280.1 (with English translation).

* cited by examiner

SHAFT SEALING DEVICE, ROTATING MACHINE, AND METHOD FOR MANUFACTURING SHAFT SEALING DEVICE

FIELD

The present invention relates to a shaft sealing device, a rotating machine, and a method for manufacturing the shaft sealing device.

BACKGROUND

In a rotating machine such as a gas turbine, a steam turbine, and a compressor, a shaft sealing device that seals a periphery of a rotating shaft, disclosed in Japanese Patent Publication No. 2011-185219, is known. The shaft sealing device disclosed in Japanese Patent Publication No. 2011-185219 includes a plurality of leaves (thin plates) to be arranged in the periphery of the rotating shaft and side seal plates (side leaves) to be arranged each in a high pressure space and a low pressure space divided by the leaves. During stoppage of the rotating shaft, a tip (inner side end) of each leaf is in contact with an outer peripheral surface of the rotating shaft. During rotation of the rotating shaft, the tip of the leaf is displaced away from the rotating shaft, and the leaf and the rotating shaft are not in contact with each other. Each side seal plate approaches a side end of the leaf by an action of pressure and suppresses an excess inflow of an operating gas in the high pressure space among the leaves.

Technical Problem

For example, when a side seal plate is pressed tightly against a side end of a leaf with large force, a tip of the leaf may not separate from a rotating shaft during rotation thereof. Rotation of the rotating shaft in contact with the leaf causes abrasion of the leaf. As a result, seal performance may decline.

SUMMARY

An object of the present invention is to provide a shaft sealing device, a rotating machine, and a method for manufacturing the shaft sealing device for suppressing the decline in performance.

Solution to Problem

According to an aspect of the present invention, a shaft sealing device comprises: a plurality of leaves that is arranged in a periphery of a rotating shaft and divides a space around the rotating shaft into two spaces in an axial direction of the rotating shaft; and a side seal plate that is arranged on one side of the leaves in the axial direction and includes an opposite surface facing a side end on the one side of the leaves. The leaves and/or the side seal plate includes a friction reducing portion configured to reduce a friction force between the opposite surface and a surface of the side end.

According to the present invention, a leaf and/or a side seal plate has a friction reducing portion that reduces a friction force between an opposite surface and a surface of a side end. Therefore, even when the side seal plate is pressed against the side end of the leaf, it can be ensured that the side seal plate does not prevent displacement of a tip of the leaf. Therefore, during rotation of a rotating shaft, the tip of the leaf smoothly moves away from the rotating shaft and is not in contact with the rotating shaft. Thus, the rotation of the rotating shaft in contact with the leaf is suppressed, and a decline in seal performance is suppressed.

Advantageously, in the shaft sealing device, the friction reducing portion includes a film with a low friction coefficient, formed on the opposite surface and/or the surface of the side end. For example, formation of a highly lubricating film by subjecting the opposite surface of the side seal plate to at least one of plating treatment, thermal spray treatment, and vapor deposition treatment can reduce the friction force between the opposite surface and the surface of the side end.

Advantageously, in the shaft sealing device, the friction reducing portion is formed by texturing treatment on the opposite surface and/or the surface of the side end. For example, formation of a dimple or a grid-like microlevel concave-convex surface by subjecting the opposite surface of the side seal plate to texturing treatment such as sandblast processing reduces a contact area between the opposite surface and the surface of the side end, and thus can reduce the friction force therebetween.

Advantageously, in the shaft sealing device, the friction reducing portion includes a concave surface or a convex surface formed on the opposite surface and/or the surface of the side end. For example, formation of a convex surface on the surface of the side end of the leaf reduces the contact area between the opposite surface and the surface of the side end, and thus can reduce the friction force therebetween.

According to another aspect of the present invention, a rotating machine comprises a rotating shaft and any one of the above described shaft sealing device to be arranged in the periphery of the rotating shaft.

According to the present invention, the shaft sealing device described above is included, and thus a decline in seal performance is suppressed. Thus, a rotating machine with a long life-span and good maintainability is provided.

According to still another aspect of the present invention, a method for manufacturing a shaft sealing device including a leaf and a side seal plate to be arranged facing a side end of the leaf, comprising the steps of: performing friction reducing treatment, on a surface of the side end of the leaf and/or an opposite surface of the side seal plate facing the side end, for reducing a friction force between the opposite surface and the surface of the side end; arranging a plurality of the leaves in a periphery of a rotating shaft and dividing a space around the rotating shaft into two spaces in an axial direction of the rotating shaft; and arranging the side seal plate, on one side of the leaf in the axial direction, such that a side end on the one side of the leaf and the opposite surface face each other.

According to the present invention, the surface of the side end of the leaf and/or the opposite surface of the side seal plate has been subjected to friction reducing treatment for reducing the friction force between the opposite surface and the surface of the side end. Therefore, even when the side seal plate is pressed against the side end of the leaf, it can be ensured that the side seal plate does not prevent the displacement of the tip of the leaf. Therefore, during rotation of a rotating shaft, the tip of the leaf smoothly moves away from the rotating shaft and is not in contact with the rotating shaft. Thus, the rotation of the rotating shaft in contact with the leaf is suppressed, and a decline in seal performance is suppressed.

Advantageous Effects of Invention

According to the present invention, a decline in performance is suppressed.

DESCRIPTION OF EMBODIMENTS

Embodiments according to the present invention will be described below with reference to the drawings. The present invention is not limited to these embodiments. Components in the embodiments that will be described below can be combined appropriately. Some components may not be used.

First Embodiment

Figure 1:
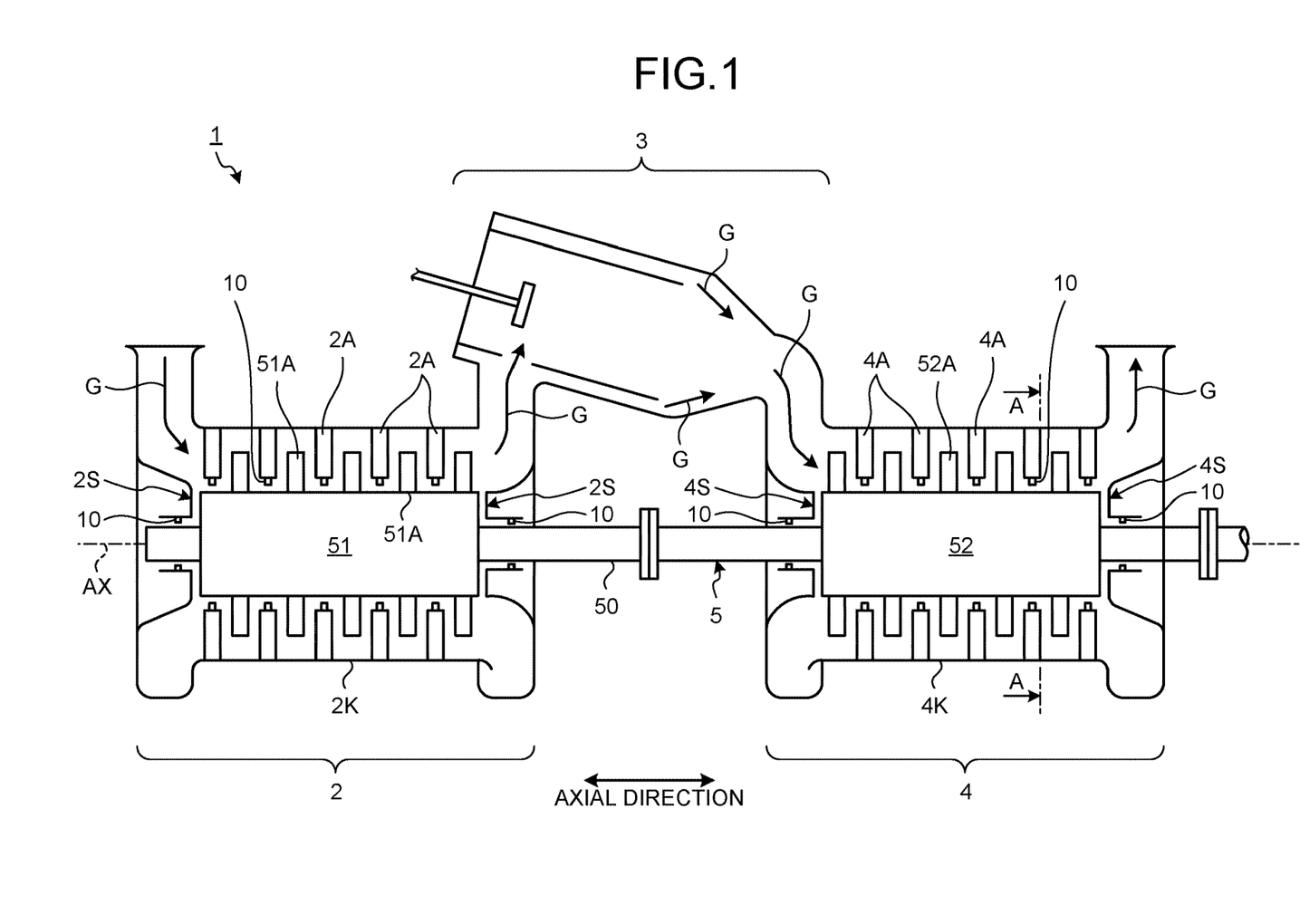
FIG. 1 is a diagram illustrating an exemplary gas turbine system according to a first embodiment of the present invention.

FIG. 1 is a diagram illustrating an example of a gas turbine system 1 including a rotating machine according to the present embodiment. As illustrated in FIG. 1, the gas turbine system 1 includes a compressor 2, a combustor 3, a turbine 4, and a rotor 5 including a rotating shaft 50. In the present embodiment, the rotating machine includes the compressor 2 and/or the turbine 4.

The compressor 2 compresses air that has been introduced. The compressor 2 has a casing 2K. Air is introduced into an internal space of the casing 2K.

The air compressed by the compressor 2 is mixed with a fuel and combusted in the combustor 3.

The turbine 4 introduces and expands a combustion gas generated by the combustor 3, and converts thermal energy of the combustion gas into rotational energy. The turbine 4 has a casing 4K. The combustion gas is introduced into an internal space of the casing 4K.

The rotor 5 has the rotating shaft 50, and turbine blades 51A and 52A provided on the rotating shaft 50. The turbine blade 51A is provided on a part 51 of the rotating shaft 50 arranged in the internal space of the casing 2K. The turbine blade 52A is provided on a part 52 of the rotating shaft 50 arranged in the internal space of the casing 4K.

The compressor 2 has a compressor vane 2A arranged in the casing 2K. In the compressor 2, a plurality of turbine blades 51A and compressor vanes 2A is arranged alternately in a direction parallel to an axis AX (axial direction) of the rotating shaft 50.

The turbine 4 has a turbine vane 4A arranged in the casing 4K. In the turbine 4, a plurality of turbine blades 52A and turbine vanes 4A is arranged alternately in an axial direction of the rotating shaft 50.

In the turbine 4, the combustion gas introduced from the combustor 3 is fed to the turbine blade 52A. As a result, the thermal energy of the combustion gas is converted into mechanically rotational energy, and power is generated. Part of the power generated in the turbine 4 is transmitted to the compressor 2 via the rotating shaft 50. Part of the power generated in the turbine 4 is used as power for the compressor 2.

The gas turbine system 1 includes a supporting portion 2S that is arranged in the compressor 2 and has a bearing rotatably supporting the rotating shaft 50, and a supporting portion 4S that is arranged in the turbine 4 and has a bearing rotatably supporting the rotating shaft 50.

The gas turbine system 1 includes a shaft sealing device 10 that seals a periphery of the rotating shaft 50. The shaft sealing device 10 is arranged in the compressor 2 and the turbine 4, respectively.

The shaft sealing device 10 to be arranged in the compressor 2 suppresses leakage of the compressed air, which is an operating gas G, from a high pressure side to a low pressure side. The shaft sealing device 10 of the compressor 2 is arranged on an inner peripheral portion of the compressor vane 2A. The shaft sealing device 10 of the compressor 2 is also arranged on the supporting portion 2S.

The shaft sealing device 10 to be arranged in the turbine 4 suppresses the leakage of the combustion gas which is the operating gas G from the high pressure side to the low pressure side. The shaft sealing device 10 of the turbine 4 is arranged on an inner peripheral portion of the turbine vane 4A. The shaft sealing device 10 of the turbine 4 is also arranged on the supporting portion 4S.

Figure 2:
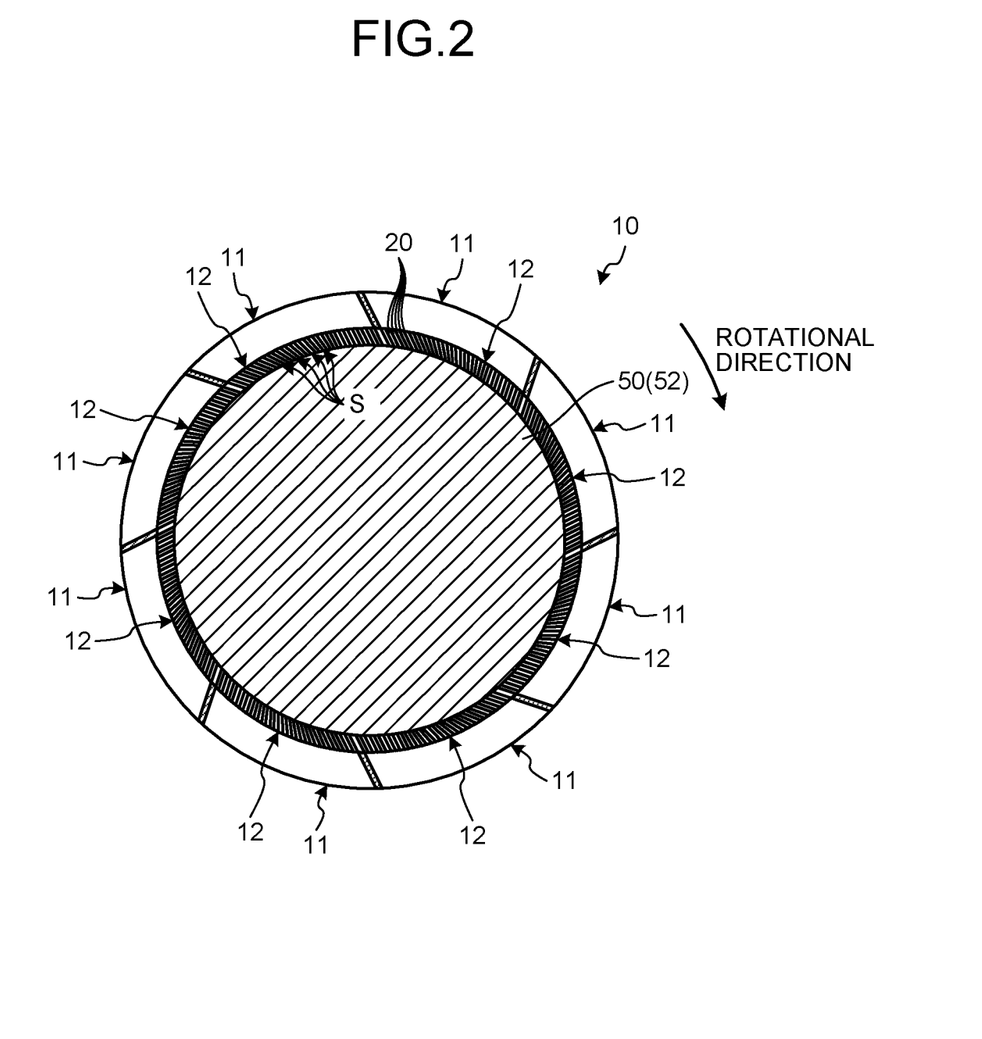
FIG. 2 is a sectional view illustrating a schema of a shaft sealing device according to the first embodiment.
Figure 3:
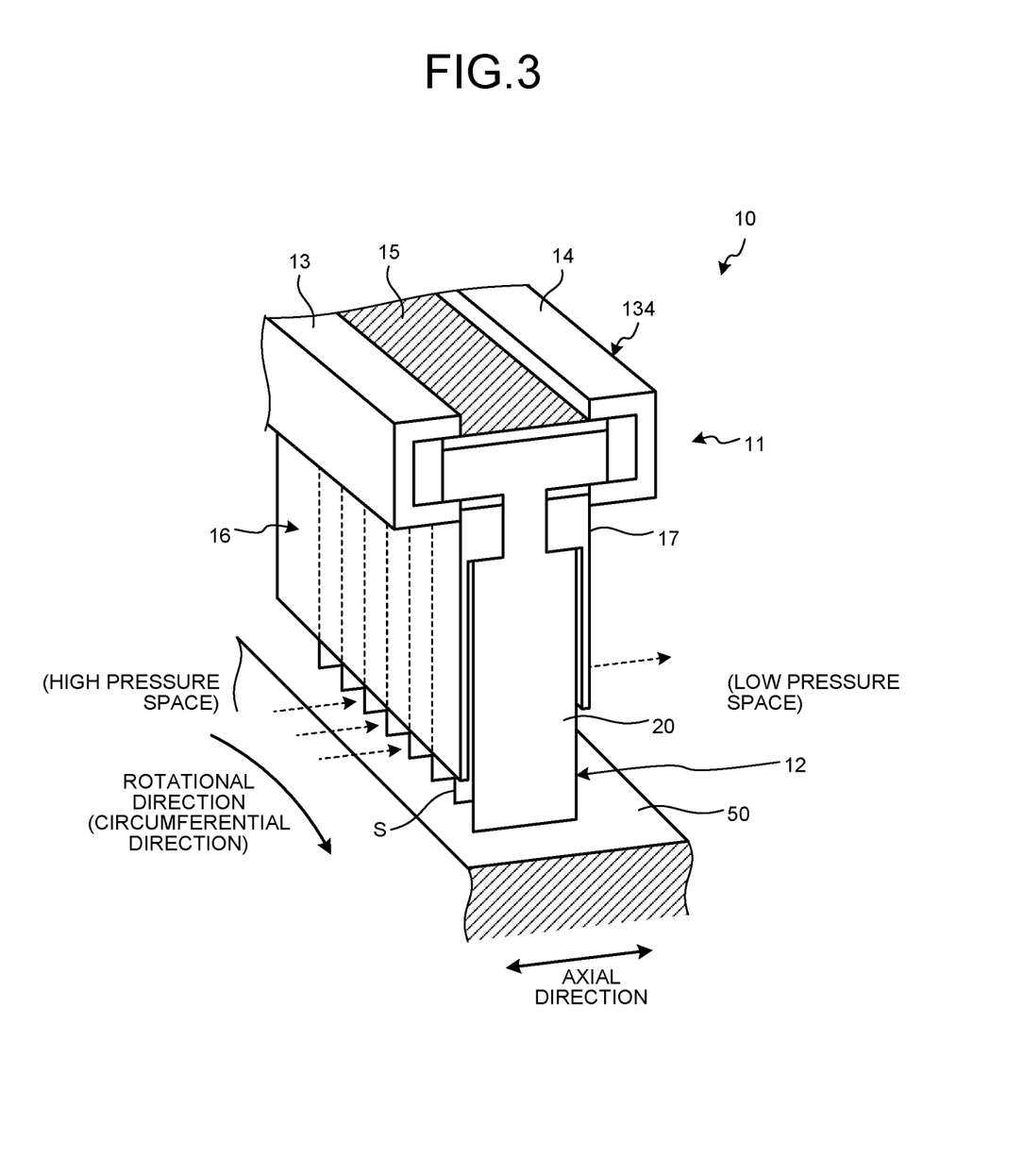
FIG. 3 is a perspective view typically illustrating a part of the shaft sealing device according to the first embodiment.
Figure 4:
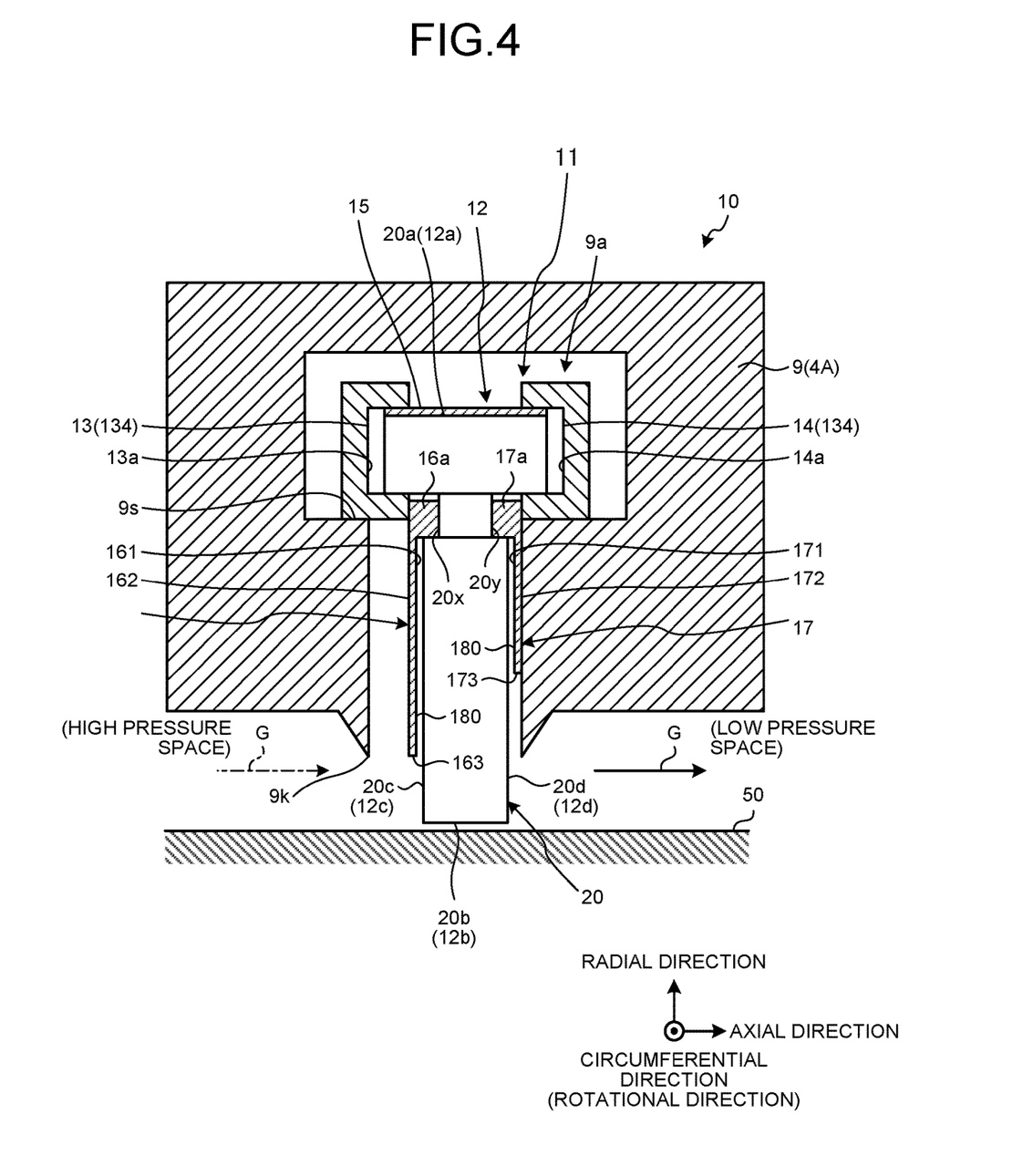
FIG. 4 is a sectional view illustrating a schema of the shaft sealing device according to the first embodiment.
Figure 5:
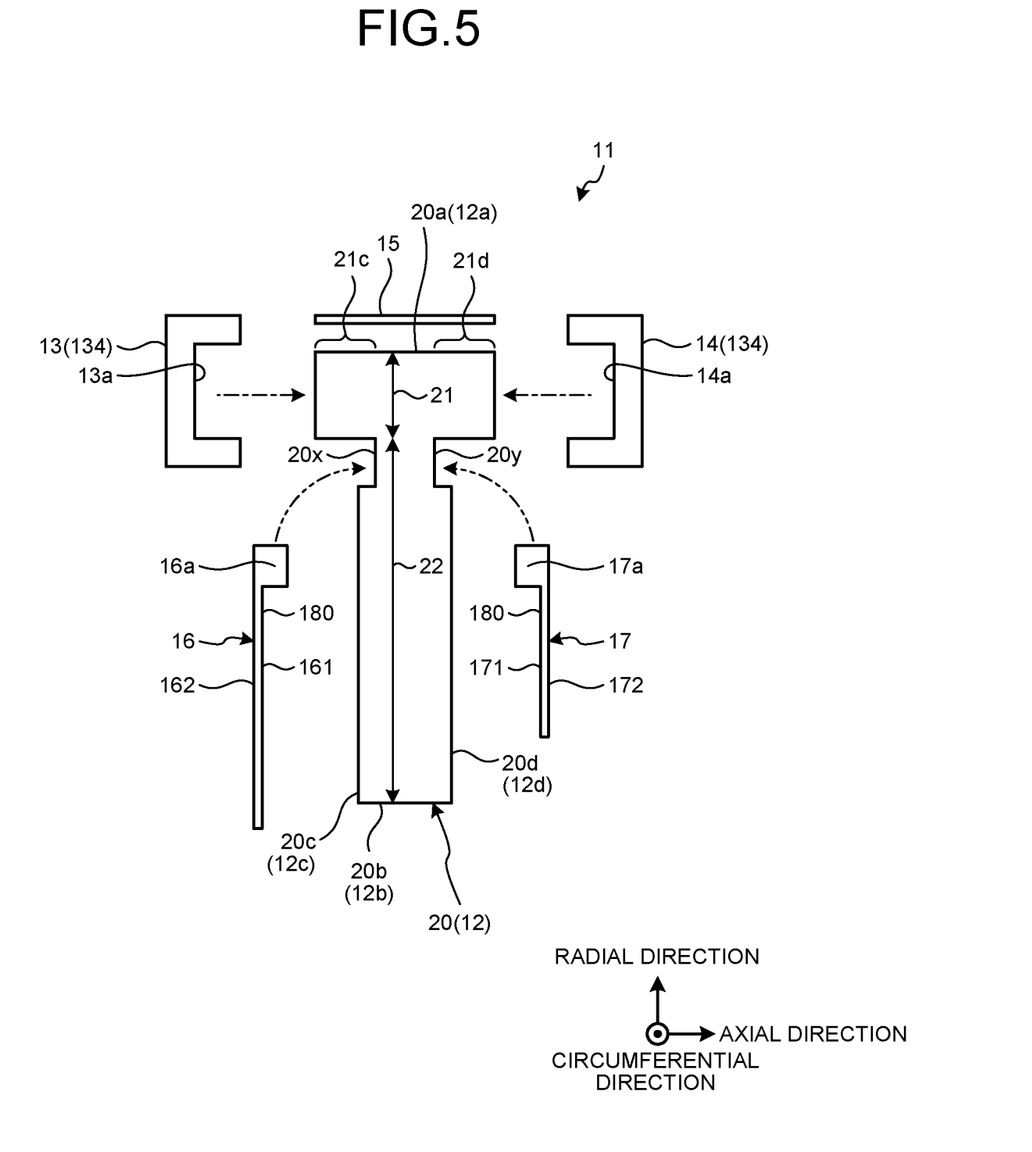
FIG. 5 is an exploded view of the shaft sealing device according to the first embodiment.

Next, the shaft sealing device 10 will be described. FIG. 2 is a sectional view illustrating a schema of the shaft sealing device 10 according to the present embodiment. FIG. 2 is equivalent to an A-A line sectional view of FIG. 1. FIG. 3 is a perspective view typically illustrating a part of the shaft sealing device 10 according to the present embodiment. FIG. 3 illustrates the shaft sealing device 10 with a part thereof broken. FIG. 4 is a sectional view illustrating a schema of the shaft sealing device 10 including the axis AX of the rotating shaft 50. FIG. 5 is an exploded view of the shaft sealing device 10.

In the following descriptions, of the shaft sealing device 10 provided in the compressor 2 and the turbine 4, respectively, that provided in the turbine 4 will be described. A structure of the shaft sealing device 10 provided in the compressor 2 is equivalent to one of the shaft sealing device 10 provided in the turbine 4.

As illustrated in FIG. 2, the shaft sealing device 10 has a plurality of seal segments 11 to be arranged in the periphery of the rotating shaft 50. In a plane perpendicular to the axis AX, each seal segment 11 is arc shaped. In the present embodiment, eight seal segments 11 are arranged in the periphery of the rotating shaft 50.

As illustrated in FIGS. 3, 4, and 5, each seal segment 11 includes a plurality of leaves (thin plates) 20 to be arranged in the periphery of the rotating shaft 50, a high pressure-side side seal plate 16 arranged on one side of the leaves 20 in the axial direction of the rotating shaft 50, a low pressure-side side seal plate 17 arranged on the other side of the leaves 20 in the axial direction of the rotating shaft 50, a retaining member 134 including retaining rings 13 and 14 that retain the leaves 20, and a back spacer 15 to be arranged between the leaves 20 and the retaining member 134.

As illustrated in FIG. 4, the seal segment 11 is inserted into a housing 9. The housing 9 is equivalent to at least one of the compressor vane 2A, supporting portion 2S, turbine vane 4A, and supporting portion 4S. The housing 9 has a recess 9a. The recess 9a has an opening 9k facing an outer peripheral surface of the rotating shaft 50. At least a part of the seal segment 11 is arranged in the recess 9a of the housing 9. The recess 9a is extended in a circumferential direction of the rotating shaft 50. A part of each leaf 20 protrudes toward the outside of the recess 9a.

The leaf 20 is a flexible plate member. The leaf 20 is elastically deformable. In the present embodiment, the leaf 20 is a thin steel plate. A normal line of a surface of the leaf 20 is nearly parallel to the circumferential direction (rotational direction) of the rotating shaft 50. A width direction of the leaf 20 is nearly the same as the axial direction of the rotating shaft 50. A thickness direction of the leaf 20 is nearly the same as the circumferential direction of the rotating shaft 50. The leaf 20 has flexibility in the circumferential direction of the rotating shaft 50. The leaf 20 has high rigidity in the axial direction of the rotating shaft 50.

A plurality of leaves 20 is arranged at a distance in the circumferential direction of the rotating shaft 50. A space S is formed between one leaf 20 and another leaf 20 adjacent thereto. A leaf laminate 12 is formed by the leaves 20. The leaf laminate 12 is an assembly (laminate) of the leaves 20.

The leaves 20 (leaf laminate 12) divide a space around the rotating shaft 50 into two spaces in the axial direction of the rotating shaft 50 by sealing the periphery of the rotating shaft 50. In the present embodiment, the leaves 20 divide the space around the rotating shaft 50 into a high pressure space and a low pressure space. Pressure in the high pressure space is higher than one in the low pressure space.

Each of the leaves 20 has an outer base end (outer end) 20a and an inner tip (inner end) 20b in a radiation direction (radial direction) of the axis AX of the rotating shaft 50, and a side end 20c on a side of the high pressure space and a side end 20d on a side of the low pressure space in the axial direction of the rotating shaft 50.

In the following descriptions, the base ends 20a, tips 20b, side ends 20c, and side ends 20d of the leaves 20 are collectively and conveniently called a base end 12a, tip 12b, side end 12c, and side end 12d of the leaf laminate 12, respectively. The base end 12a is an assembly of the base ends 20a. The tip 12b is an assembly of the tips 20b. The side end 12c is an assembly of the side ends 20c. The side end 12d is an assembly of the side ends 20d.

The base end 12a faces outward in the radial direction. The tip 12b faces inward in the radial direction so as to face the outer peripheral surface of the rotating shaft 50. The side end 12c faces one side (side of the high pressure space) of the rotating shaft 50 in the axial direction. The side end 12d faces the other side (side of the low pressure space) of the rotating shaft 50 in the axial direction. The tip 12b (tips 20b) is arranged outside the recess 9a via the opening 9k.

In the present embodiment, each of the base ends 20a of the leaves 20 is fixed to the back spacer 15. On the other hand, each of the tips 20b of the leaves 20 is not fixed. That is, in the present embodiment, the base ends 20a are fixed ends, while the tips 20b are free ends. The leaves 20 (leaf laminate 12) are retained by the retaining member 134 with the base ends 20a fixed.

Each leaf 20 has a head portion 21 and a body portion 22. The base end 20a is arranged in the head portion 21. The tip 20b, side end 20c, and side end 20d are arranged in the body portion 22. A size of the body portion 22 in the width direction (axial direction of the rotating shaft 50) is smaller than one of the head portion 21. The size of the body portion 22 in the thickness direction (circumferential direction of the rotating shaft 50) is smaller than that of the head portion 21. The body portion 22 has cutouts 20x and 20y in a boundary section between the head portion 21 of the body portion 22.

In the present embodiment, the leaves 20 are connected by welding to each of sideway protrusions 21c and 21d of the head portion 21. The body portion 22 is elastically deformable.

The retaining member 134 retains the leaf laminate 12. The retaining member 134 is supported by the housing 9. The housing 9 has a supporting surface 9s inside the recess 9a. The retaining member 134 is supported by the supporting surface 9s.

The retaining member 134 includes the retaining rings 13 and 14. Each of the retaining rings 13 and 14 is an arc-shaped member extending in the circumferential direction of the rotating shaft 50. The retaining ring 13 has a recess 13a where a part of the head portion 21 including the sideway protrusion 21c of the leaves 20 is arranged. The retaining ring 14 has a recess 14a where a part of the head portion 21 including the sideway protrusion 21d of the leaves 20 is arranged. The back spacer 15 is arranged between the head portion 21 of the leaves 20 and the retaining rings 13 and 14.

The head portion 21 of the leaves 20 is fit into the recesses 13a and 14b via the back spacer 15. As a result, the leaf laminate 12 is retained by the retaining member 134.

The high pressure-side side seal plate 16 is arranged adjacent to the leaves 20 (leaf laminate 12) in the high pressure space. The low pressure-side side seal plate 17 is arranged adjacent to the leaves 20 (leaf laminate 12) in the low pressure space. The high pressure-side side seal plate 16 is arranged facing a part of the side end 12c of the leaf laminate 12 in the high pressure space. The low pressure-side side seal plate 17 is arranged facing a part of the side end 12d of the leaf laminate 12 in the low pressure space.

The high pressure-side side seal plate 16 has an opposite surface 161 facing at least a part of the side ends 20c of the leaves 20 (side end 12c of the leaf laminate 12) and a surface 162 facing an opposite direction of the opposite surface 161.

The low pressure-side side seal plate 17 has an opposite surface 171 facing at least a part of the side ends 20d of the leaves 20 (side end 12d of the leaf laminate 12) and a surface 172 facing an opposite direction of the opposite surface 171.

The high pressure-side side seal plate 16 has a protrusion 16a to be arranged in the cutout 20x of the leaves 20. The protrusion 16a arranged in the cutout 20x is fixed by the leaves 20 (leaf laminate 12) and the retaining ring 13.

The low pressure-side side seal plate 17 has a protrusion 17a to be arranged in the cutout 20y of the leaves 20. The protrusion 17a arranged in the cutout 20y is fixed by the leaves 20 (leaf laminate 12) and the retaining ring 14.

In the present embodiment, a tip 163 of the high pressure-side side seal plate 16 is farther away from the rotating shaft 50 than the tips 20b of the leaves 20. The high pressure-side side seal plate 16 faces a part of the side ends 20c (side end 12c) on a side of the base ends 20a in the radial direction, and does not face a part of the side ends 20c (side end 12c) on a side of the tips 20b.

In the present embodiment, a tip 173 of the low pressure-side side seal plate 17 is farther away from the rotating shaft 50 than the tips 20b of the leaves 20. The low pressure-side side seal plate 17 faces a part of the side ends 20d (side end 12d) on the side of the base ends 20a in the radial direction, and does not face a part of the side ends 20d (side end 12d) on the side of the tips 20b.

In the present embodiment, the tip 173 of the low pressure-side side seal plate 17 is farther away from the rotating shaft 50 than the tip 163 of the high pressure-side side seal plate 16. In the present embodiment, a size of the high pressure-side side seal plate 16 is larger than one of the low pressure-side side seal plate 17 in the radial direction of the rotating shaft 50.

Figure 6:
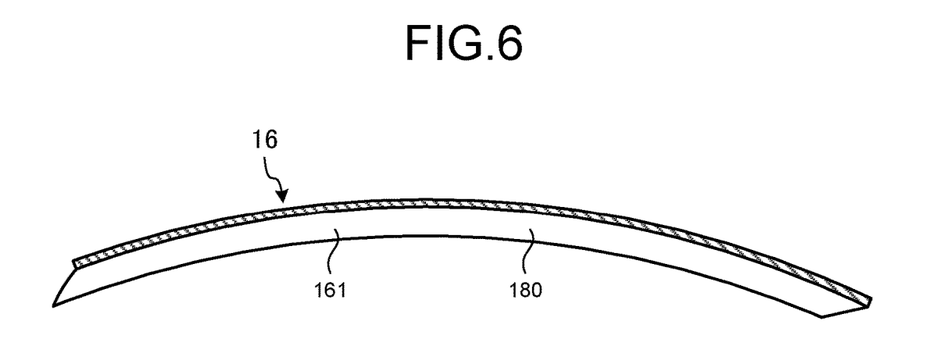
FIG. 6 is a diagram illustrating a high pressure-side side seal plate according to the first embodiment.

FIG. 6 is a diagram of the high pressure-side side seal plate 16 viewed from a side of the opposite surface 161. As illustrated in FIG. 6, the high pressure-side side seal plate 16 is a flexible fan-shaped plate member. The high pressure-side side seal plate 16 is elastically deformable. In the present embodiment, the high pressure-side side seal plate 16 is a thin steel plate.

In the present embodiment, the high pressure-side side seal plate 16 has a friction reducing portion for reducing a friction force between the opposite surface 161 and a surface (side) of each side end 20c. The friction reducing portion reduces the friction force between the high pressure-side side seal plate 16 and each leaf 20. In the present embodiment, the high pressure-side side seal plate 16 has been subjected to friction reducing treatment for reducing the friction force against the surface (side) of the side end 20c.

In the present embodiment, the friction reducing portion includes a film 180 with a low friction coefficient formed on the high pressure-side side seal plate 16. The friction reducing treatment includes treatment for forming the film 180 with a low friction coefficient on a surface (opposite surface) of a base material of the high pressure-side side seal plate 16. The film 180 is formed on the opposite surface of a steel plate that is the base material of the high pressure-side side seal plate 16. In the present embodiment, the opposite surface 161 is a surface of the film 180. A friction coefficient of the surface of the film 180 against the surface of the side end 20c is smaller than one of the surface of the base material (steel plate) of the high pressure-side side seal plate 16.

The film 180 can reduce the friction force between the opposite surface 161 and the surface of the side end 20c by forming the highly lubricating film 180 through at least one of plating treatment, thermal spray treatment, and vapor deposition treatment, for example, on the surface (opposite surface) of the base material of the high pressure-side side seal plate 16.

The film 180 may be, for example, a Cr film formed by Cr plating treatment or a carbon film formed by DLC (diamond-like carbon) coating treatment.

The film 180 is formed so as to have a uniform thickness. In a case where a thickness of the high pressure-side side seal plate 16 is approx. 0.3 mm, a thickness of the film 180 may be 0.05 mm or more and 0.1 mm or less. In a case where the film 180 is formed of a material which has abrasion resistance and is hard to change secularly, the thickness of the film 180 may be 0.1 mm or more and 0.3 mm or less.

A total thickness of the film 180 and the base material of the high pressure-side side seal plate 16 may be set at 0.1 mm or more and 0.5 mm or less. As a result, performance of the high pressure-side side seal plate 16 is exerted. In a case where the total thickness of the film 180 and the base material of the high pressure-side side seal plate 16 is 0.3 mm or more, strength of the high pressure-side side seal plate 16 against a swirl is sufficiently maintained.

Figure 7:
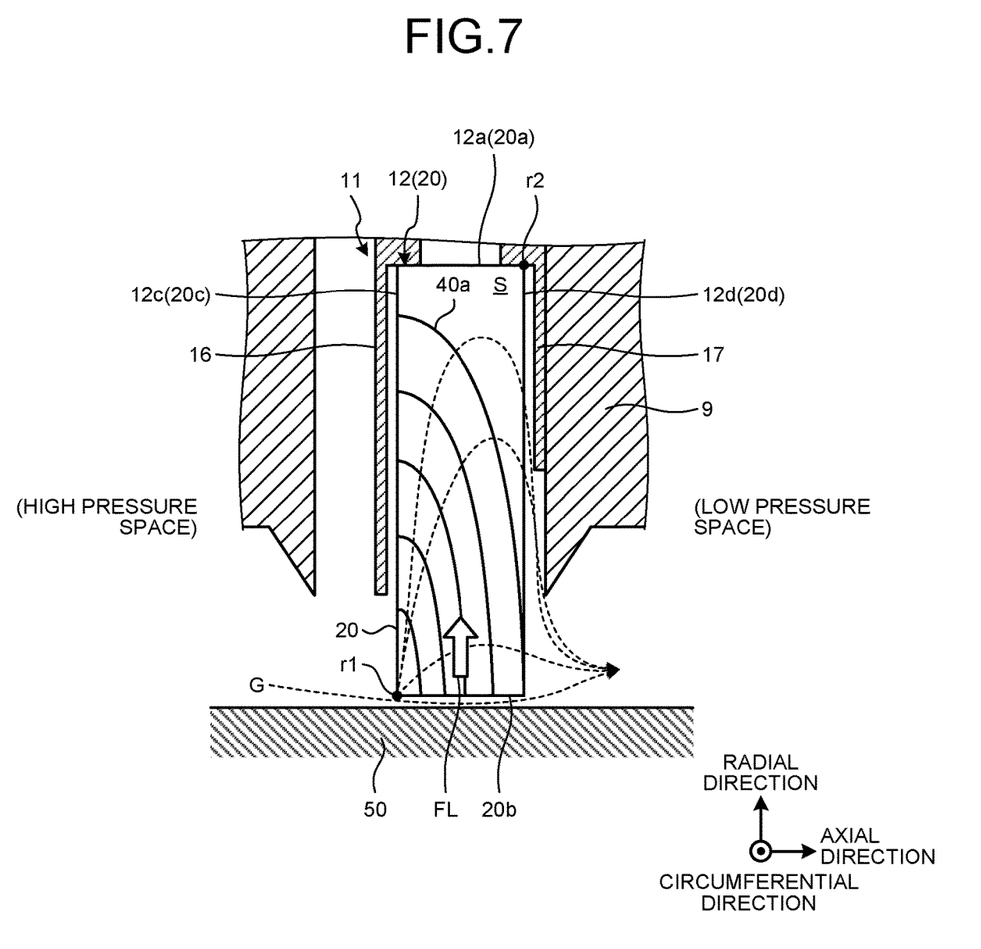
FIG. 7 is a pressure distribution diagram of an operating gas to be formed in spaces among leaves according to the first embodiment.
Figure 8:
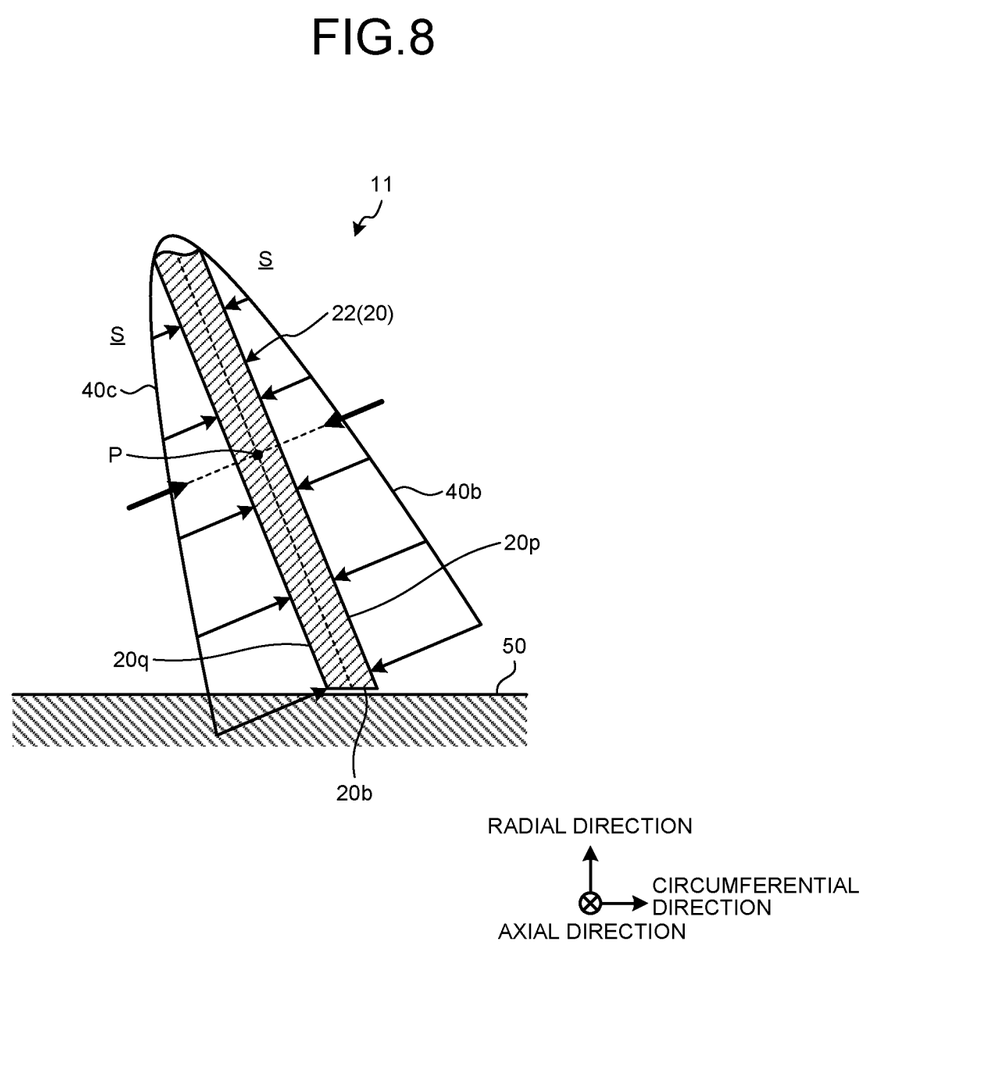
FIG. 8 is a diagram illustrating a cross section of a body portion of the leaf and pressure acting on the body section in vector according to the first embodiment.

Next, functions of the seal segment 11 will be described. FIG. 7 is a pressure distribution diagram of the operating gas G to be formed in the space S. FIG. 8 is a diagram illustrating a cross section of the body portion 22 crossing the axis AX of the rotating shaft 50 and pressure acting on the body portion 22 in vector.

During stoppage of the rotating shaft 50, the tip 20b of the leaf 20 is in contact with the outer peripheral surface of the rotating shaft 50 at a predetermined precompression. Start-up of the gas turbine system 1 and rotation of the rotating shaft 50 causes the tip 20b of the leaf 20 in contact with the outer peripheral surface of the rotating shaft 50 to be abraded by the outer peripheral surface thereof.

An increase in rotational frequency of the rotating shaft 50 to a predetermined frequency causes the tip 20b of the leaf 20 to be displaced (float) away from the outer peripheral surface of the rotating shaft 50 due to a dynamic pressure effect generated by the rotation of the rotating shaft 50, and the leaf 20 and the rotating shaft 50 are not in contact with each other. The rotation of the rotating shaft 50 not in contact with the leaf 20 seals the operating gas G in a minute space formed between the leaf 20 and the rotating shaft 50. As illustrated in FIG. 7, the space around the rotating shaft 50 is divided by the leaf 20 into the high pressure space and the low pressure space of the operating gas G. The rotation of the rotating shaft 50 not in contact with the leaf 20 suppresses abrasion of the leaf 20 and the rotating shaft 50

As illustrated in FIG. 7, at least part of the operating gas G in the high pressure space flows between the tip 20b of the leaf 20 and the outer peripheral surface of the rotating shaft 50 toward the low pressure space. At least part of the operating gas G in the high pressure space also flows into the space S from a part of the side end 20c which does not face the high pressure-side side seal plate 16. The high pressure-side side seal plate 16 faces most parts of the side end 20c. Therefore, an excess inflow of the operating gas G in the high pressure space into the space S is suppressed.

In the present embodiment, a pressure distribution of the space S between the leaves 20 adjacent to each other can be adjusted by adjusting the size of the high pressure-side side seal plate 16 (distance between the tip 163 and the outer peripheral surface of the rotating shaft 50) and the size of the low pressure-side side seal plate 17 (distance between the tip 173 and the outer peripheral surface of the rotating shaft 50) in the radial direction.

In the present embodiment, the size of the low pressure-side side seal plate 17 is smaller than that of the high pressure-side side seal plate 16. Consequently, the pressure distribution of the space S gradually becomes smaller from the tip 20b toward the base end 20a. The pressure distribution assists a floating force due to the dynamic pressure effect.

The operating gas G that has flowed from the high pressure space into the space S flows from a corner r1 of the leaf 20 toward a corner r2 thereof along the surface of the leaf 20. The corner r1 is a corner on the side of the tip 20*b* and on the side of the high pressure space. The corner r2 is a corner on the side of the base end 20*a* and on the side of the low pressure space. The corner r2 is a diagonal corner of the corner r1.

The size of the low pressure-side side seal plate 17 in the radial direction is smaller than that of the high pressure-side side seal plate 16. Therefore, as illustrated in FIG. 7, a pressure distribution 40*a* is formed where pressure at the corner r1 is the highest and gradually decreases toward the corner r2.

The pressure in the space S gradually decreases toward the base end 20*a* of the leaf 20. Therefore, as illustrated in FIG. 8, a pressure distribution 40*b* acting on a surface 20*p* of the leaf 20 and a pressure distribution 40*c* acting on a surface 20*q* facing an opposite direction of the surface 20*p* are each the highest near the tip 20*b* of the leaf 20 and gradually decreases toward the base end 20*a*.

As illustrated in FIG. 8, the pressure distribution 40*b* acting on the surface 20*p* and the pressure distribution 40*c* acting on the surface 20*q* are nearly the same. In the present embodiment, each of the leaves 20 is arranged oblique to a tangent line of the outer peripheral surface of the rotating shaft 50. Therefore, a difference is generated between pressure acting on the surface 20*p* and pressure acting on the surface 20*q* at an arbitrary point P between the base end 20*a* and the tip 20*b* of the leaf 20. Specifically, the pressure acting on the surface 20*q* is higher than the pressure acting on the surface 20*p*. Consequently, a floating force FL is generated on the leaf 20 such that the tip 20*b* of the leaf 20 separates from the outer peripheral surface of the rotating shaft 50.

Figure 9:
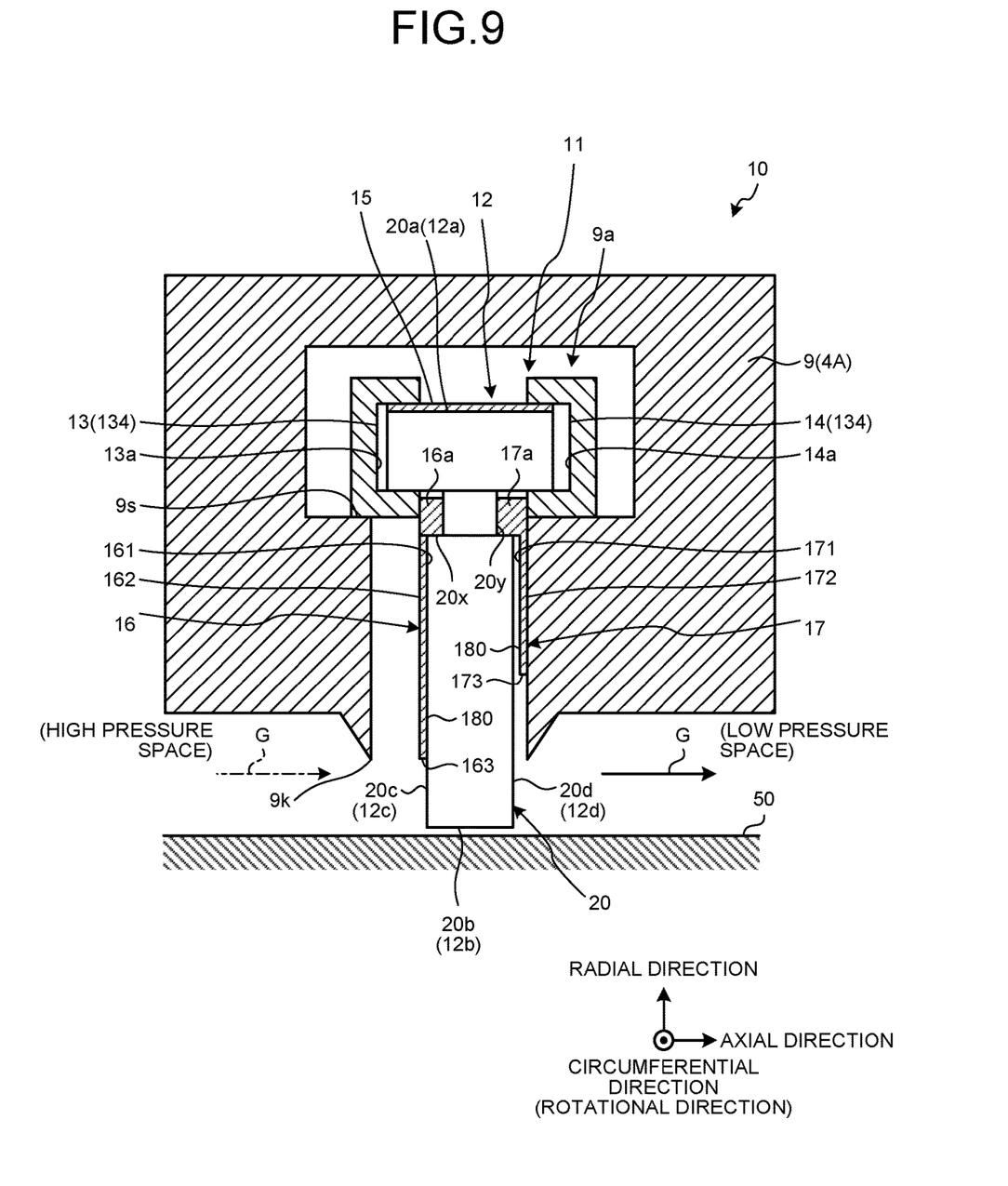
FIG. 9 is a diagram illustrating an exemplary shaft sealing device according to the first embodiment.

FIG. 9 is a diagram illustrating an example of the shaft sealing device 10 according to the present embodiment. Formation of the high and low pressure spaces may cause the seal segment 11 to receive a force from the high pressure space toward the low pressure space, and the low pressure-side side seal plate 17 to adhere to the housing 9. An increase in pressure in the high pressure space may cause the high pressure-side side seal plate 16 to be pressed tightly against the side end 20*c* of the leaf 20 with large force. Pressure on the high pressure-side side seal plate 16 against the side end 20*c* of the leaf 20 with large force may make it impossible for the tip 20*c* of the leaf 20 to separate from the rotating shaft 50 during the rotation thereof. That is, the force with which the high pressure-side side seal plate 16 is pressed against the side end 20*c* of the leaf 20 increases, and with the increasing force, the friction force between the opposite surface 161 and the side end 20*c* increases. As a result, the tip 20*c* of the leaf 20 may not float smoothly from the outer peripheral surface of the rotating shaft 50.

In the present embodiment, the opposite surface 161 of the high pressure-side side seal plate 16 is formed by the surface of the film 180 with a low friction coefficient. Therefore, the friction force between the opposite surface 161 and the surface of the side ends 20*c* (side end 12*c*) is reduced. Thus, the tip 20*c* of the leaf 20 can smoothly float from the outer peripheral surface of the rotating shaft 50.

Figure 10:
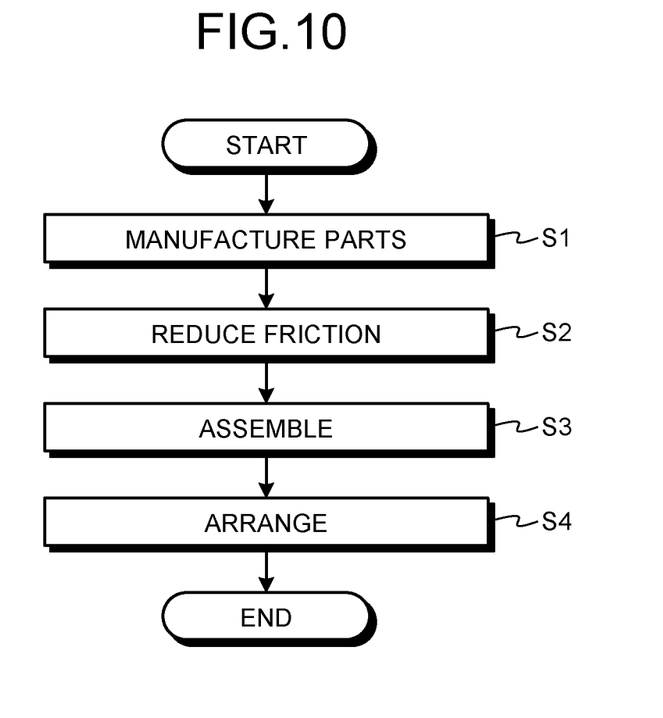
FIG. 10 is a flowchart illustrating an exemplary method for manufacturing the shaft sealing device according to the first embodiment.

Next, an example of a method for manufacturing the shaft sealing device 10 according to the present embodiment will be described with reference to FIG. 10. FIG. 10 is a flowchart illustrating an example of the method for manufacturing the shaft sealing device 10 according to the present embodiment.

Parts composing the shaft sealing device 10 (such as leaf 20, high pressure-side side seal plate 16, and low pressure-side side seal plate 17) are manufactured (step S1).

After the parts are manufactured, the surface (opposite surface) of the high pressure-side side seal plate 16 is subjected to friction reducing treatment for reducing the friction force against the surface of the side end 20*c* (step S2). As described above, the friction reducing treatment includes treatment for forming the film 180 with a low friction coefficient on the surface (opposite surface) of the base material of the high pressure-side side seal plate 16, and includes, for example, at least one of plating treatment, thermal spray treatment, and vapor deposition treatment.

Next, the leaf 20, high pressure-side side seal plate 16, and low pressure-side side seal plate 17 are assembled, and the seal segment 11 is manufactured (step S3).

The seal segment 11 is arranged in the periphery of the rotating shaft 50 (step S4). As a result, a plurality of leaves 20 is arranged in the periphery of the rotating shaft 50, and the space around the rotating shaft 50 is divided into two spaces that are the high pressure space and the low pressure space in the axial direction of the rotating shaft 50. On one side of each leaf 20 (side of the high pressure space) in the axial direction of the rotating shaft 50, the high pressure-side side seal plate 16 is arranged such that the side end 20*c* of the leaf 20 and the opposite surface 161 face each other. On the other side of the leaf 20 (side of the low pressure space) in the axial direction of the rotating shaft 50, the low pressure-side side seal plate 17 is arranged such that the side end 20*d* of the leaf 20 and the opposite surface 171 face each other.

In the present embodiment, all parts of the opposite surface 161 may be formed of the film 180, or a part of the opposite surface 161 may be formed of the film 180 and a part thereof may be the surface of the base material (steel plate) of the high pressure-side side seal plate 16.

In the present embodiment, the surface of the side end 20*c* may be formed of the film 180 with a low friction coefficient. The opposite surface 171 of the low pressure-side side seal plate 17 may be formed of the film 180 with a low friction coefficient, or the surface of the side end 20*d* may be formed of the film 180 with a low friction coefficient. The surface 162 of the high pressure-side side seal plate 16 may be formed of the film 180 with a low friction coefficient, or the surface 172 of the low pressure-side side seal plate 17 may be formed of the film 180 with a low friction coefficient.

As described above, according to the present embodiment, the leaf 20 and/or the high pressure-side side seal plate 16 is subjected to friction reducing treatment for reducing the friction force between the opposite surface 161 and the surface of the side end 20*c*. Therefore, even when the high pressure-side side seal plate 16 is pressed against the side end 20*c* of the leaf 20, it can be ensured that the high pressure-side side seal plate 16 does not prevent the displacement (flotation) of the tip 20*b* of the leaf 20. Therefore, during the rotation of the rotating shaft 50, the tip 20*c* of the leaf 20 smoothly moves away from the rotating shaft 50 and is not in contact with the rotating shaft 50. Thus, the rotation of the rotating shaft 50 in contact with the leaf 20 is suppressed, and a decline in seal performance is suppressed.

In the present embodiment, the friction reducing treatment is treatment for making the opposite surface 161 and/or the surface of the side end 20*c* into the surface of the film 180 with a low friction coefficient, and the friction reducing portion includes the film 180 with a low friction coefficient. For example, the friction force between the opposite surface 161 and the surface of the side end 20*c* can be reduced by forming the highly lubricating film 180 through at least one of plating treatment, thermal spray treatment, and vapor deposition treatment on the surface of the high pressure-side side seal plate 16.

Second Embodiment

A second embodiment will be described. In the following descriptions, sections identical or equivalent to those in the above embodiment bear identical signs, and the descriptions thereof will be simplified or omitted.

In the present embodiment, an example where friction reducing treatment includes treatment for texturing an opposite surface 161 of a high pressure-side side seal plate 16 will be described. In the present embodiment, a friction reducing portion for reducing a friction force between the opposite surface 161 (high pressure-side side seal plate 16) and a surface of a side end 20c (leaf 20) includes a concave-convex surface to be formed on the opposite surface 161 by subjecting the opposite surface 161 to texturing treatment.

Figure 11:
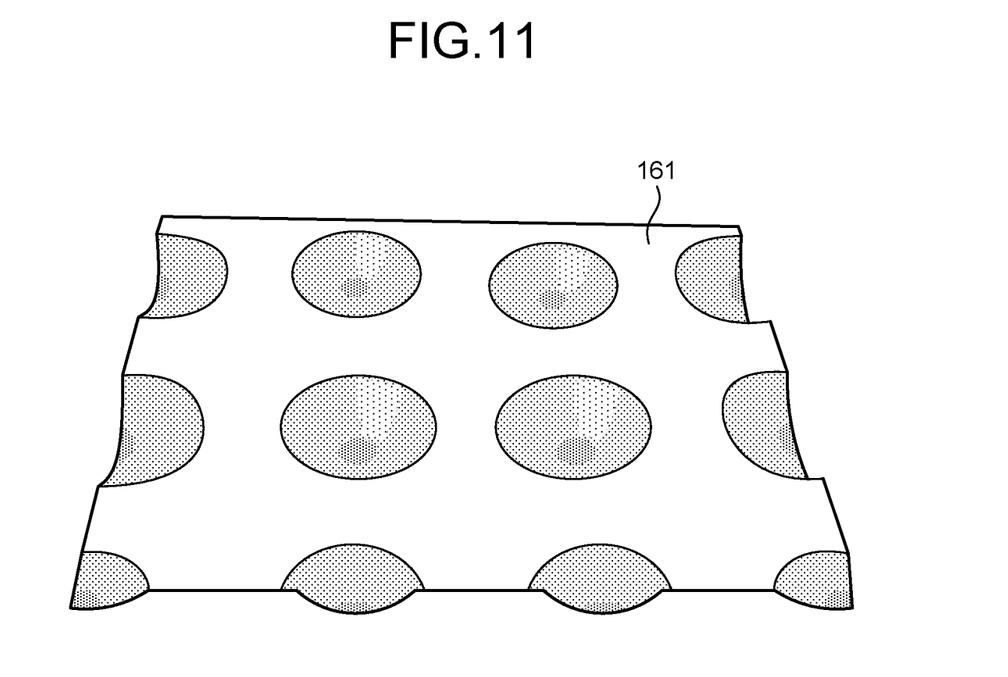
FIG. 11 is a diagram illustrating an exemplary opposite surface according to a second embodiment.
Figure 12:
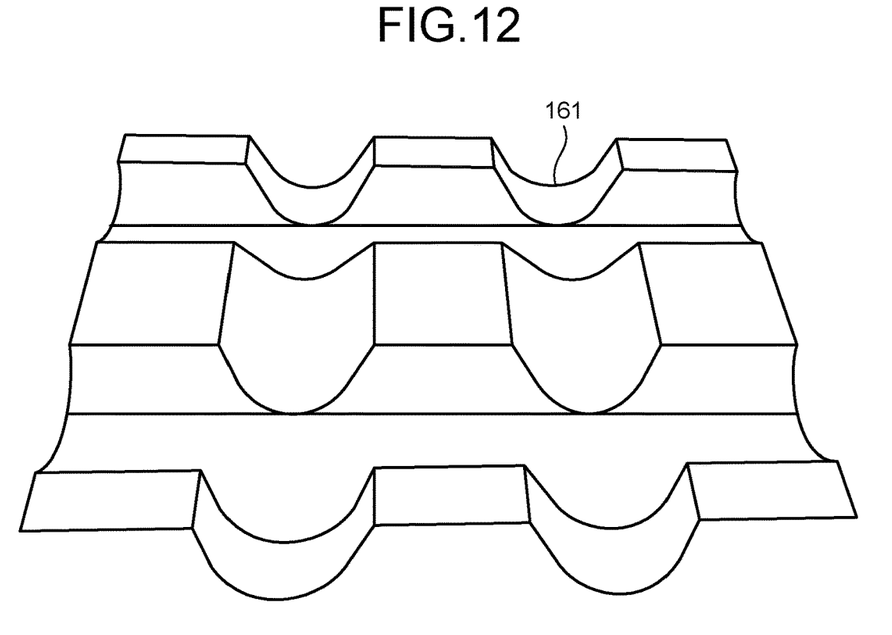
FIG. 12 is a diagram illustrating an exemplary opposite surface according to the second embodiment.

FIGS. 11 and 12 are each a diagram illustrating an example of the opposite surface 161 after texturing. For example, by subjecting the opposite surface 161 of the high pressure-side side seal plate 16 to texturing treatment such as sandblast processing, the opposite surface 161 may be made into a dimple microlevel concave-convex surface as illustrated in FIG. 11, or a grid-like microlevel concave-convex surface as illustrated in FIG. 12. In FIG. 11, a diameter of one dimple may be 1 μm or larger and 100 μm or less. In FIG. 12, a size of one grid may be 1 μm or larger and 100 μm or less.

As described above, according to the present embodiment, a contact area between the opposite surface 161 and the surface of the side end 20c becomes smaller by making the opposite surface 161 into the microlevel concave-convex surface through texturing treatment. Therefore, the friction force between the opposite surface 161 and the surface of the side end 20c can be reduced.

In the present embodiment, all parts of the opposite surface 161 may be textured, or a part of the opposite surface 161 may be textured and a part thereof may not be textured.

In the present embodiment, the surface of the side end 20c may be textured. An opposite surface 171 of a low pressure-side side seal plate 17 may be textured, or a surface of a side end 20d may be textured. A surface 162 of the high pressure-side side seal plate 16 may be textured, or a surface 172 of the low pressure-side side seal plate 17 may be textured.

Third Embodiment

A third embodiment will be described. In the following descriptions, sections identical or equivalent to those in the above embodiments bear identical signs, and the descriptions thereof will be simplified or omitted.

In the present embodiment, an example where friction reducing treatment includes treatment for making a surface of a side end 20c into a convex surface will be described. In the present embodiment, a friction reducing portion for reducing a friction force between an opposite surface 161 (high pressure-side side seal plate 16) and the surface of the side end 20c (leaf 20) includes the convex surface of the side end 20c.

Figure 13:
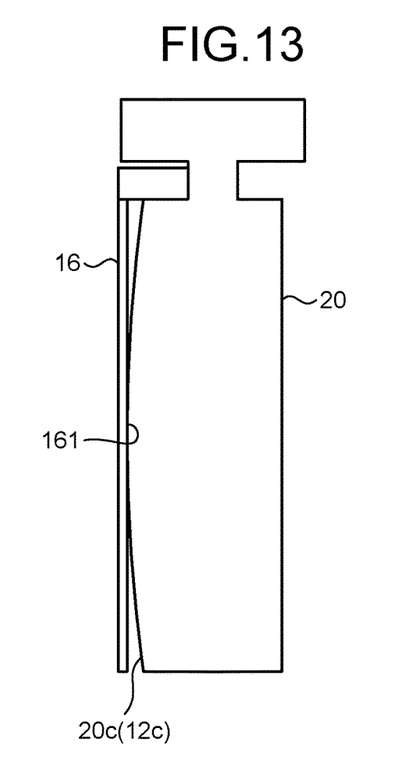
FIG. 13 is a pattern diagram illustrating an exemplary leaf and high pressure-side side seal plate according to a third embodiment.

FIG. 13 is a pattern diagram illustrating exemplary leaf 20 and high pressure-side side seal plate 16 according to the present embodiment. As illustrated in FIG. 13, the side end 20c of the leaf 20 may be a convex surface expanding toward the high pressure-side side seal plate 16. In the example illustrated in FIG. 13, the convex surface of the side end 20c is in a curved shape. As a result, a contact area between the opposite surface 161 and the surface of the side end 20c becomes smaller. Therefore, the friction force therebetween can be reduced.

Figure 14:
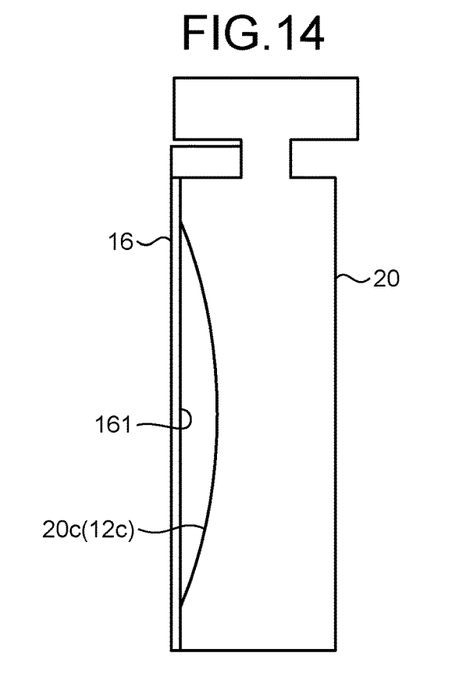
FIG. 14 is a pattern diagram illustrating an exemplary leaf and high pressure-side side seal plate according to the third embodiment.

FIG. 14 is a pattern diagram illustrating exemplary leaf 20 and high pressure-side side seal plate 16 according to the present embodiment. As illustrated in FIG. 14, the side end 20c of the leaf 20 may be a concave surface separated from the high pressure-side side seal plate 16. In the example illustrated in FIG. 14, the friction reducing portion includes the concave surface of the side end 20c. In the example illustrated in FIG. 14, the concave surface of the side end 20c is in a curved shape. The contact area between the opposite surface 161 and the surface of the side end 20c also becomes smaller in this way. Therefore, the friction force therebetween can be reduced.

Figure 15:
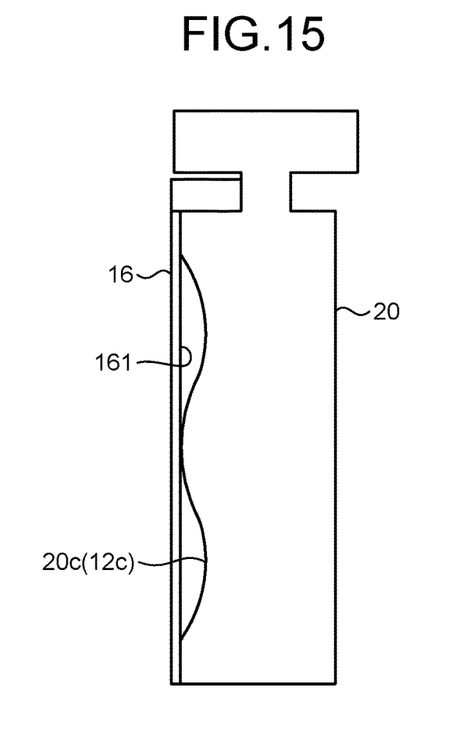
FIG. 15 is a pattern diagram illustrating an exemplary leaf and high pressure-side side seal plate according to the third embodiment.

FIG. 15 is a pattern diagram illustrating exemplary leaf 20 and high pressure-side side seal plate 16 according to the present embodiment. As illustrated in FIG. 15, the side end 20c of the leaf 20 may include both convex and concave surfaces. In the example illustrated in FIG. 15, the friction reducing portion includes the convex and concave surfaces of the side end 20c. The contact area between the opposite surface 161 and the surface of the side end 20c also becomes smaller in this way. Therefore, the friction force therebetween can be reduced.

In the present embodiment, the opposite surface 161 of the high pressure-side side seal plate 16 may include the concave surface and/or the convex surface. An opposite surface 171 of a low pressure-side side seal plate 17 may include the concave surface and/or the convex surface, or a surface of a side end 20d may include the concave surface and/or the convex surface.

DESCRIPTION OF SIGNS

1 Gas turbine system
2 Compressor (rotating machine)
3 Combustor
4 Turbine (rotating machine)
10 Shaft sealing device
11 Seal segment
12 Leaf laminate
12c Side end
12d Side end
16 High pressure-side side seal plate
17 Low pressure-side side seal plate
20 Leaf
20c Side end
20d Side end
50 Rotating shaft
161 Opposite surface
162 Surface
180 Film

The invention claimed is:

1. A shaft sealing device comprising:
a plurality of leaves that is arranged in a circumferential direction of a rotating shaft and divides a space around the rotating shaft into two spaces in an axial direction of the rotating shaft; and
a side seal plate that is arranged on one side of the plurality of leaves in the axial direction of the rotating shaft and includes an opposite surface facing a side end on the one side of the plurality of leaves,
wherein the opposite surface of the side seal plate includes a friction reducing portion configured to reduce a friction force between the opposite surface of the side seal plate and a surface of the side end on the one side of the plurality of leaves;

wherein the friction reducing portion includes a textured surface having a microlevel concave-convex surface formed on the opposite surface of the side seal plate by a texturing treatment;

wherein the side end on the one side of the plurality of leaves has a curved convex surface expanding toward the side seal plate, a curved concave surface separated from the side seal plate, or a curved convex-concave surface;

wherein the curved convex surface, the curved concave surface, or the curved convex-concave surface is only on a high pressure side; and wherein the curved convex surface, the curved concave surface, or the curved convex-concave surface extends from a top corner of the side end on the one side of the plurality of leaves to a bottom corner of the side end on the one side of the plurality of leaves.

2. A rotating machine comprising:

a rotating shaft; and the shaft sealing device according to claim 1, to be arranged in a periphery of the rotating shaft.

3. A method for manufacturing a shaft sealing device including a plurality of leaves and a side seal plate to be arranged facing a side end of the plurality of leaves, the method comprising:

performing friction reducing treatment, on an opposite surface of the side seal plate facing the side end of the plurality of leaves, for reducing a friction force between the opposite surface of the side seal plate and a surface of the side end of the plurality of leaves;

arranging the plurality of leaves in a circumferential direction of a rotating shaft and dividing a space around the rotating shaft into two spaces in an axial direction of the rotating shaft; and arranging the side seal plate, on one side of the plurality of leaves in the axial direction of the rotating shaft, such that the side end of the plurality of leaves is on the one side of the plurality of leaves and faces the opposite surface of the side seal plate, wherein the performing friction reducing treatment includes forming, by a texturing treatment, a textured surface having a microlevel concave-convex surface on the opposite surface of the side seal plate;

wherein the side end on the one side of the plurality of leaves has a curved convex surface expanding toward the side seal plate, a curved concave surface separated from the side seal plate, or a curved convex-concave surface;

wherein the curved convex surface, the curved concave surface, or the curved convex-concave surface is only on a high pressure side; and wherein the curved convex surface, the curved concave surface, or the curved convex-concave surface extends from a top corner of the side end on the one side of the plurality of leaves to a bottom corner of the side end on the one side of the plurality of leaves.

4. The method according to claim 3, wherein the side end on the one side of the plurality of leaves has the curved convex surface expanding toward the side seal plate and the curved concave surface separated from the side seal plate.

5. The shaft sealing device according to claim 1, wherein the side end on the one side of the plurality of leaves has the curved convex surface expanding toward the side seal plate and the curved concave surface separated from the side seal plate.

* * * * *